May 27, 1930.    E. JANIK    1,760,700
AUTOMATIC VARIABLE SPEED GEAR

Filed Feb. 20, 1929

INVENTOR
E. Janik
BY
Langner, Parry, Card & Langner
ATTYS.

Patented May 27, 1930

1,760,700

UNITED STATES PATENT OFFICE

EDUARD JANIK, OF VIENNA, AUSTRIA

AUTOMATIC VARIABLE-SPEED GEAR

Application filed February 20, 1929, Serial No. 341,445, and in Austria February 27, 1928.

This invention relates to an automatic variable speed gear wherein the power is transmitted by a crank, the length of the crank arm being automatically increased as the load decreases and automatically decreased as the load increases.

Figure 1:
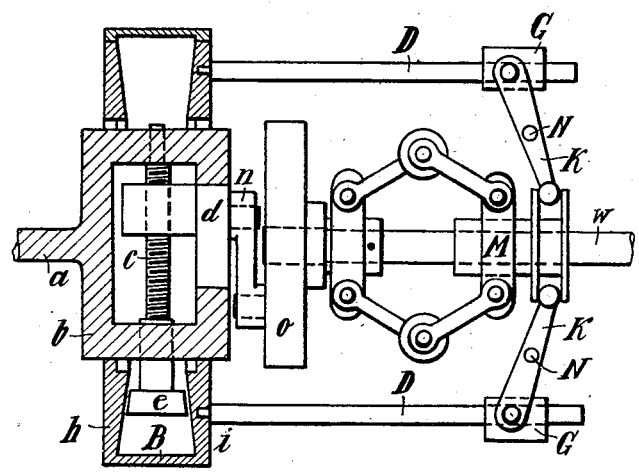
Figure 2:
Figure 3:
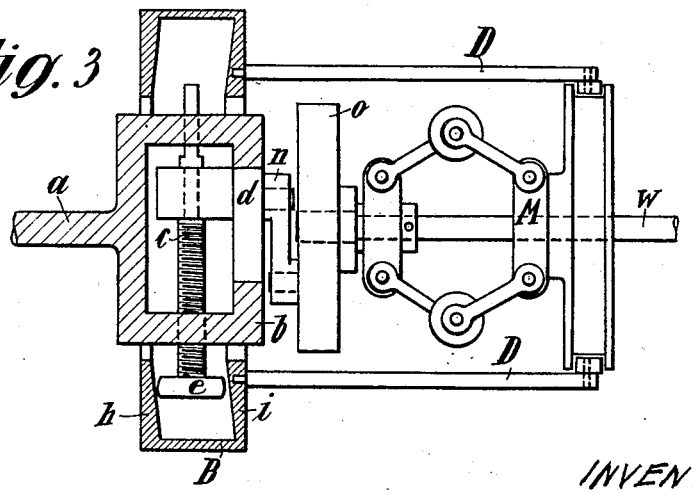

The invention is illustrated in the annexed drawing in which Figs. 1 and 3 show plan views of two different constructional forms of the invention; Fig. 2 shows a detail.

On the driving shaft $a$ a frame $b$ is secured carrying a screw $c$, actuating a sliding block $d$. The movable sliding block constitutes the crank arm. The screw $c$ carries a toothed or frictional gear $e$ cooperating with a couple of toothed or frictional wheels $h$ $i$ connected by a yoke B to form a unit secured to rods D and movable with them axially.

The transmission of power from the driving shaft $a$ to the driven shaft $w$ is effected by a link $n$ through the medium of any one way clutch wheel $o$ mounted on the driven shaft.

The rods D together with the yoke B are actuated in any desired manner by centrifugal force operating the governor M mounted on the driven shaft $w$. In the example shown this is done by the levers K pivoted in the frame at N.

On the rods D are arranged two slidable sleeves G with friction jaws or blocks H, Fig. 2, which are forced against the rods D by screws and springs in such a manner, that the sleeves can move along the rods only with a certain degree of friction. The sleeves G move the rods D and the yoke B in either direction whereby the wheels $h$ or $i$ are brought into engagement with the wheel $e$ on the one or the other side thereof.

The movement of the yoke B required for causing the wheels $h$ or $i$ to engage with the wheel $e$ is limited, whereas the length of the stroke of the levers K may vary and is dependent of the varying centrifugal force exerted by the governor M. The levers K move the yoke B into either of the operative positions by means of the friction sleeves G whereupon the yoke and the sleeves are stopped until the actuation of the sleeves by the governor ceases or is reversed.

Before starting the sleeve of the governor M is in its extreme right hand position and the crank arm is at its minimum length.

If now, owing to the rotation of the shaft $w$, the sleeve of the governor M begins to move to the left, the wheel $h$ comes into engagement with the wheel $e$ whereby the length of the crank arm is increased and may soon reach its maximum as in the case of a vehicle motor starting on a horizontal road, while starting upwards on an incline the crank arm will be lengthened too rapidly and the number of revolutions of the driven shaft will soon decrease whereby, owing to the decrease of the centrifugal force, the governor will cause the wheel $i$ to engage with the wheel $e$, so that the crank arm shortens. Thereby the number of revolutions of the driven shaft $w$ increases and the sleeve of the governor M moves to the left tending to bring the wheel $h$ into engagement with the wheel $e$ and so on. Thus the variable speed gear always tends to bring about the most favorable transmission of power.

In the constructional form shown in Fig. 3 the levers K and sleeves G are dispensed with and the yoke B is directly actuated by the sleeve of the governor and the rods D.

What I claim is:

1. In an automatic variable speed gear the combination of a driving shaft, a frame fast on such driving shaft, a screw revolubly mounted in such frame, a nut mounted on such screw and a crank pin secured to such nut, a wheel fast on the said screw, two actuating wheels located on opposite sides of the wheel on the screw, the planes of such actuating wheels being parallel to each other and perpendicular to the plane of the screw wheel and the said actuating wheels being adapted to engage alternatively therewith, such actuating wheels being slidingly mounted on the said frame, a driven shaft substantially coaxial with the driving shaft, a one way clutch wheel secured to such driven shaft, means operatively connected to the said crank pin for intermittently moving the said one way clutch wheel, a centrifugal governor mounted on the said driven shaft and comprising a sleeve slidably mounted on such shaft and means for operatively connecting the said sleeve to the above said actuating wheels.

2. In an automatic variable speed gear the combination of a driving shaft, a frame fast on such driving shaft, a screw revolubly mounted in such frame, a nut mounted on such screw and a crank pin secured to such nut, a wheel fast on the said screw, two actuating wheels located on opposite sides of the wheel on the screw, the planes of such actuating wheels being parallel to each other and perpendicular to the plane of the screw wheel and the said actuating wheels being adapted to engage alternatively therewith, such actuating wheels being slidingly mounted on the said frame, a yoke rigidly connecting the said actuating wheels, a driven shaft substantially coaxial with the driving shaft, a one way clutch wheel secured to such driven shaft, means operatively connected to the said crank pin for intermittently moving the said one way clutch wheel, a centrifugal governor mounted on the said driven shaft and comprising a sleeve slidably mounted on such shaft and means for operatively connecting the said sleeve to the above said actuating wheels.

In testimony whereof I have affixed my signature.

EDUARD JANIK.